United States Patent
Yamamoto et al.

(10) Patent No.: US 8,840,481 B2
(45) Date of Patent: Sep. 23, 2014

(54) POWER TRANSMISSION PART, DAMPER MECHANISM, AND FLYWHEEL ASSEMBLY

(75) Inventors: Kozo Yamamoto, Neyagawa (JP); Keisuke Fujioka, Suita (JP); Tomoki Hada, Neyagawa (JP); Kazuhiko Kawaguchi, Hirakata (JP)

(73) Assignee: EXEDY Corporation, Osaka (JP)

( * ) Notice: Subject to any disclaimer, the term of this patent is extended or adjusted under 35 U.S.C. 154(b) by 22 days.

(21) Appl. No.: 12/996,594

(22) PCT Filed: Jul. 22, 2009

(86) PCT No.: PCT/JP2009/063105
§ 371 (c)(1),
(2), (4) Date: Dec. 6, 2010

(87) PCT Pub. No.: WO2010/010896
PCT Pub. Date: Jan. 28, 2010

(65) Prior Publication Data
US 2011/0081977 A1 Apr. 7, 2011

(30) Foreign Application Priority Data

| Jul. 24, 2008 | (JP) | 2008-191516 |
| Jul. 24, 2008 | (JP) | 2008-191517 |
| Jul. 24, 2008 | (JP) | 2008-191518 |
| Jul. 24, 2008 | (JP) | 2008-191519 |
| Jul. 24, 2008 | (JP) | 2008-191520 |

(51) Int. Cl.
*F16F 15/129* (2006.01)
*F16F 15/134* (2006.01)
(52) U.S. Cl.
CPC .................. *F16F 15/134* (2013.01)
USPC ..................................... 464/68.41

(58) Field of Classification Search
USPC ......... 464/68.3, 68.4, 68.41, 68.92; 192/55.4, 192/55.61, 70.17, 205, 208, 214, 214.1
See application file for complete search history.

(56) References Cited

U.S. PATENT DOCUMENTS

| 3,128,639 A | * | 4/1964 | Hein et al. |
| 4,000,794 A | * | 1/1977 | Worner ................. 464/68.4 X |
| 4,533,031 A | * | 8/1985 | Nagano ................. 192/214.1 |
| 5,580,312 A | * | 12/1996 | Takeuchi et al. .......... 464/68.4 |
| 5,673,598 A | | 10/1997 | Duclos |
| 5,766,109 A | | 6/1998 | Sudau |
| 5,778,738 A | * | 7/1998 | Takabayashi et al. ....... 464/68.3 |

(Continued)

FOREIGN PATENT DOCUMENTS

| JP | 01-094644 U | 6/1989 |
| JP | 02-122256 U | 10/1990 |

(Continued)

OTHER PUBLICATIONS

International Search Report of the corresponding international application No. PCT/JP2009/063105, dated Sep. 15, 2009.

*Primary Examiner* — Gregory Binda
*Assistant Examiner* — Matthieu Setliff
(74) *Attorney, Agent, or Firm* — Global IP Counselors, LLP

(57) ABSTRACT

A power transmitting part for transmitting power has an annular main body section and a transmitting section. The transmitting section has a first protruding section extending outward in a radial direction from the main body section and a second protruding section extending toward a first side in an axial direction from a circumferential-direction-facing edge portion of the first protruding section.

9 Claims, 9 Drawing Sheets

(56) References Cited

U.S. PATENT DOCUMENTS

| | | |
|---|---|---|
| 6,019,683 A | 2/2000 | Sudau |
| 6,119,839 A * | 9/2000 | Jackel et al. ............... 192/205 X |
| 6,209,419 B1 * | 4/2001 | Curtis et al. ............... 464/68.41 |
| 6,461,243 B1 | 10/2002 | Uehara |
| 6,520,306 B2 | 2/2003 | Bertrand et al. |
| 7,244,184 B2 * | 7/2007 | Fukushima ................ 464/68.41 |
| 2006/0178220 A1 * | 8/2006 | Jee ............................. 464/68.41 |
| 2008/0110719 A1 | 5/2008 | Saeki et al. |

FOREIGN PATENT DOCUMENTS

| | | |
|---|---|---|
| JP | 05-022900 U | 3/1993 |
| JP | 07-027176 A | 1/1995 |
| JP | 07-208547 A | 8/1995 |
| JP | 08-505933 A | 6/1996 |
| JP | 09-072383 A | 3/1997 |
| JP | 09-242825 A | 9/1997 |
| JP | 2001-090781 A | 4/2001 |
| JP | 2003-519343 A | 6/2003 |
| JP | 2008-121762 A | 5/2008 |

* cited by examiner

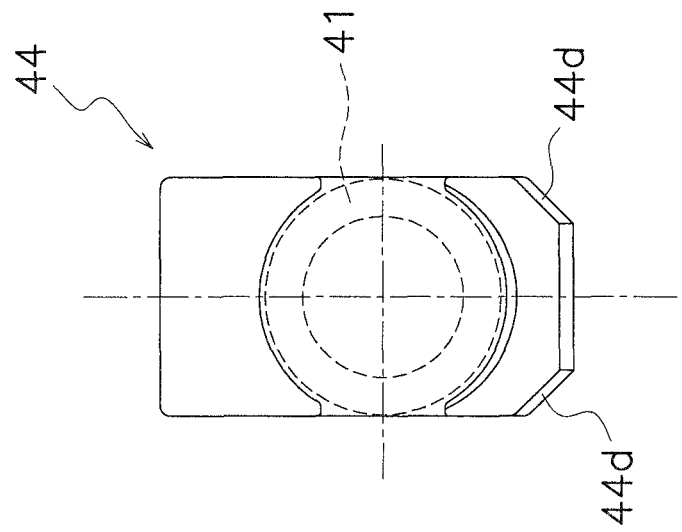
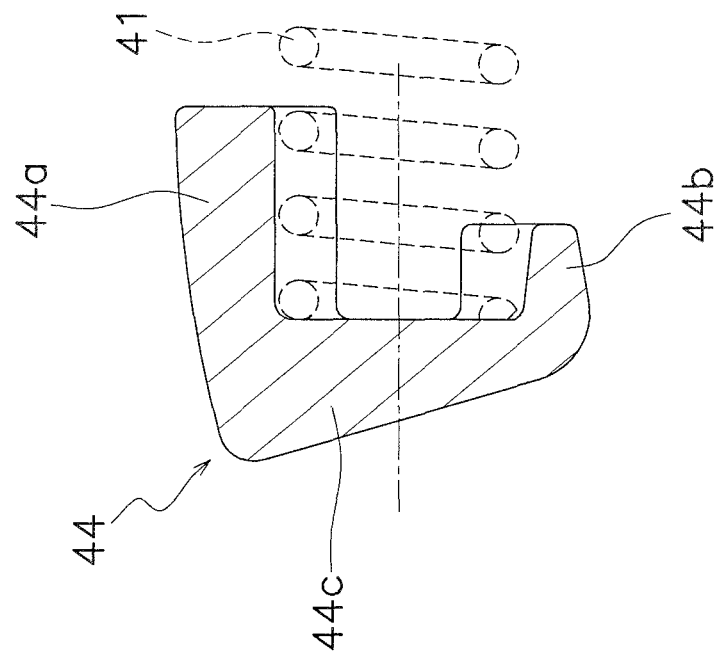
FIG. 7A
FIG. 7B

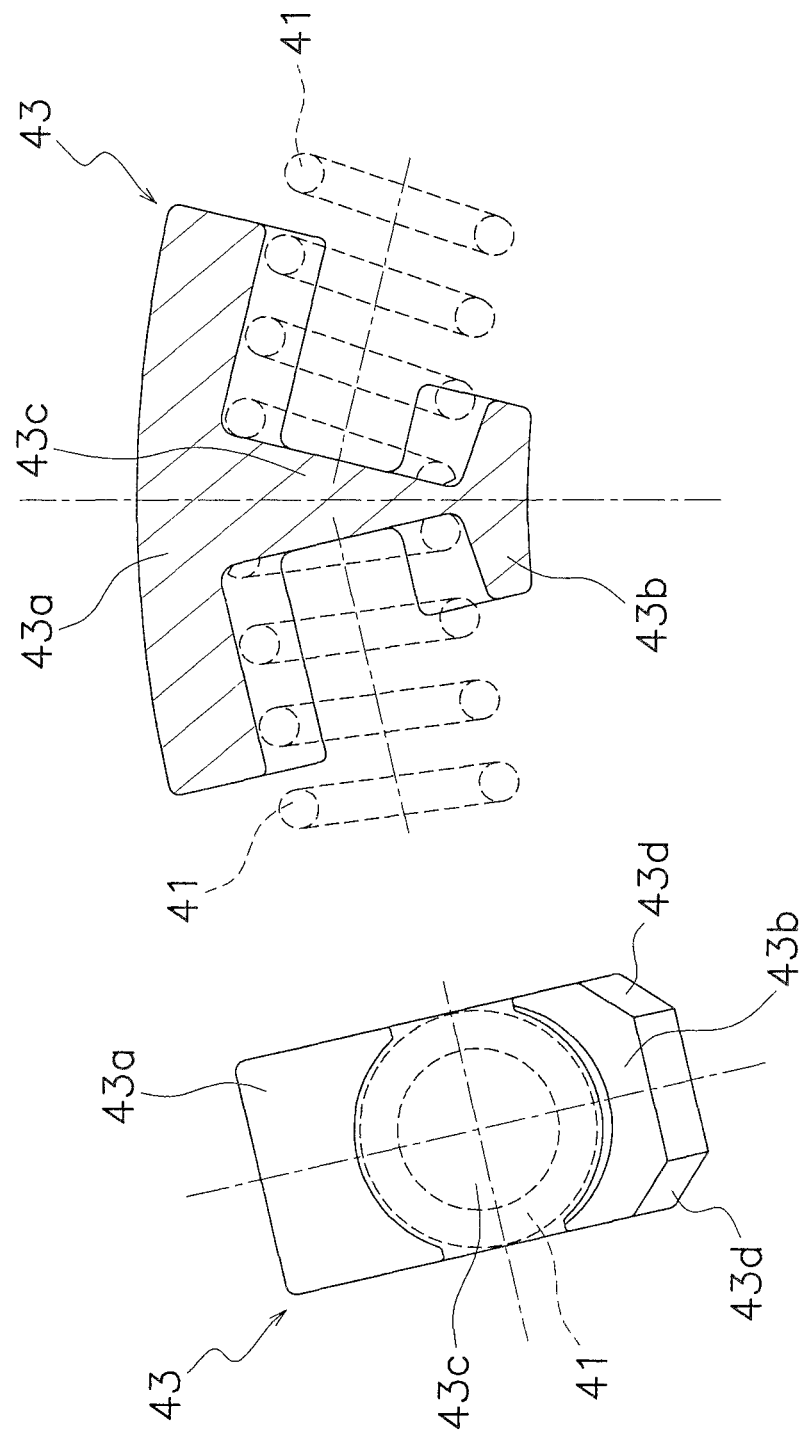

US 8,840,481 B2

POWER TRANSMISSION PART, DAMPER MECHANISM, AND FLYWHEEL ASSEMBLY

CROSS-REFERENCE TO RELATED APPLICATIONS

This U.S. National stage application claims priority under 35 U.S.C. §119(a) to Japanese Patent Application Nos. 2008-191516, 2008-191517, 2008-191518, 2008-191519, and 2008-191520, all filed in Japan on Jul. 24, 2008, the entire contents of which are hereby incorporated herein by reference.

BACKGROUND OF THE INVENTION

1. Field of the Invention

The present invention relates to a power transmitting part, a damper mechanism, and a flywheel assembly for transmitting rotary power.

2. Background Information

Various devices are installed in a drive train of a vehicle to transmit power generated by an engine. Examples of this type of device include clutch devices and flywheel assemblies. A damper mechanism is used in these devices for the purpose of damping rotational vibrations (e.g., see Japanese Laid-open Patent Publication Nos. 7-208547 and 9-242825).

This type of damper mechanism has, for example, an input member, an output member, a plurality of springs elastically connecting the input member and the output member in a rotational direction, and spring seats supporting end portions of the springs. In such a case, the input member and the output member are power transmitting parts.

In this damper mechanism, the input member starts to rotate with respect to the output member when power is transmitted to the input member. As a result, the springs are compressed between the input member and the output member and rotational vibrations are damped.

However, with conventional power transmitting parts, if a contact surface area between the input member and the spring seat is small, then surface pressure will become large and, thus, a spring seat made of resin will easily become worn. Meanwhile, if a large contact surface area is secured, then the weight of the input member will increase, which is not desirable.

In a conventional damper mechanism, a friction generating mechanism is provided to heighten vibration damping performance. The friction generating mechanism has a bush, a friction plate, and a cone spring. The bush is arranged such that it can rotate integrally with the input member. The friction plate is arranged such that it can rotate integrally with the output member. The cone spring is axially between the bush and the input member and pushes the bush and the friction plate against the output member. When the input member rotates with respect to the output member, the friction plate slides against the bush and generates a frictional resistance in a rotational direction. The frictional resistance causes a hysteresis to develop between the input member and the output member and damp rotational vibrations in an effective fashion.

In order to heighten the vibration damping performance of the damper mechanism, there is sometimes a demand to increase the hysteresis torque generated by the friction generating mechanism. However, if the effective radius of the friction member is increased, the friction generating mechanism will become larger in a radial direction, which is not desirable.

Meanwhile, a flywheel assembly has, for example, a first flywheel, a second flywheel, and a damper mechanism. The first flywheel is fixed to a crankshaft of an engine. The damper mechanism elastically connects the first flywheel and the second flywheel together in a rotational direction. A ring gear is fixed to the first flywheel to impart power to the crankshaft when the engine is started.

However, with a conventional flywheel assembly, it is necessary to machine an outer circumferential surface of the first flywheel because the first flywheel is fitted inside the ring gear and the manufacturing cost of the flywheel assembly tends to increase.

In this way, when positioning an annular member in a radial direction, it is not desirable to increase the amount of machining work because doing so induces an increase in the manufacturing cost.

Also, with a conventional damper mechanism, it is difficult to stabilize the operation of the spring seat because movement of the spring seat in a radial direction is not sufficiently restricted. When the operation of the spring seat is not stable, the vibration damping function of the damper mechanism is not stable.

However, with a conventional damper mechanism, if a contact surface area between the input member and the spring seat is small, then a spring seat made of resin will easily become worn.

SUMMARY

A first object is to provide a power transmitting part and a damper mechanism that can ensure a large power transmitting surface area while suppressing an increase in weight.

A second object is to provide a damper mechanism that can heighten a vibration damping performance while preventing an increase in size.

A third object is to provide a power transmitting part and a flywheel assembly that can enable a reduction of a manufacturing cost.

A fourth object is to provide a damper mechanism that can enable a vibration damping performance to be stabilized.

A fifth object is to provide a damper mechanism that can reduce wear of a spring seat.

A power transmitting part according to a first aspect is a part for transmitting power and has an annular main body section and a plate-like transmitting section. The transmitting section has a first protruding section that extends outward in a radial direction from the main body section and a second protruding section that extends toward a first side in an axial direction from a circumferential-direction-facing edge portion of the first protruding section.

With this power transmitting part, a power transmitting surface of the second protruding section, for example, can be made larger because the second protruding section extends toward a first side in an axial direction from a circumferential-direction-facing edge portion of the first protruding section. Additionally, since the transmitting section is plate-like, an increase of the weight of the power transmitting part can be suppressed.

A damper mechanism according to a second aspect has a first rotary body, a second rotary body, a first member, a second member, a first friction member, a second friction member, and a pressing member. The second rotary body is arranged such that it can rotate with respect to the first rotary body. The first member is provided such that it can rotate integrally with the first rotary body. The second member is provided such that it can rotate integrally with the second rotary body. The first friction member is sandwiched axially between the first member and the second member and provided such that it can rotate with respect to the first member and the second member. The first friction member is sandwiched axially between the first member and the second member and provided such that it can rotate with respect to the first member and the second rotary body. The pressing member presses the second member against the second rotary body in an axial direction.

With this damper mechanism, a friction surface can be increased because the first friction member is sandwiched axially between the first member and the second member and the second friction member is sandwiched axially between the first member and the second rotary body. Consequently, the vibration damping performance of the damper mechanism can be heightened without increasing a radial dimension of the first friction member and the second friction member.

A power transmitting part according to a third aspect is a part for transmitting power and has a ring member and a plate member. The plate member has a circular disk-like main body section and a plurality of support protrusions that protrude in an axial direction from the main body section and serve to position the ring member with respect to the main body section.

With this power transmitting part, the ring member can be readily positioned with respect to the plate member because the plate member has support protrusions. That is, the ring member can be positioned by merely providing support protrusions and the manufacturing cost can be reduced.

Additionally, the manufacturing cost of a flywheel assembly equipped with this power transmitting part can be reduced.

A damper mechanism according to a fourth aspect has a first rotary body, a second rotary body, a spring, and a spring seat. The first rotary body has a pair of first slanted surfaces that are slanted with respect to a radial direction. The second rotary body is arranged such that it can rotate with respect to the first rotary body. The spring connects the first rotary body and the second rotary body together elastically in a rotational direction. The spring seat is a member supporting an end portion of the spring and has a pair of second slanted surfaces that are slanted with respect to a radial direction and can slide with respect to the pair of first slanted surfaces.

This damper mechanism stabilizes the operation of the spring seat and enables the vibration damping performance to be stabilized because the second slanted surfaces of the spring seat can slide with respect to the first slanted surfaces of the first rotary body.

A damper mechanism according to a fifth aspect has a first rotary body, a second rotary body, at least one spring, and a first spring seat. The second rotary body is arranged such that it can rotate with respect to the first rotary body. The spring connects the first rotary body and the second rotary body together elastically in a rotational direction and is arranged to act in series between the first rotary body and the second rotary body. The first spring seat is arranged rotationally between the second rotary body and a first end portion of the spring and touches against the second rotary body in a rotational direction. A contact surface area between the first spring seat and the second rotary body is 250 mm$^2$ or larger.

With this damper mechanism, wear of the first spring seat can be reduced because the contact surface area between the first spring seat and the second rotary body is 250 mm$^2$ or larger.

BRIEF DESCRIPTION OF DRAWINGS

FIG. 7A is an elevational view of a first spring seat,
and FIG. 7B is a cross-sectional view of the first spring seat.
FIG. 8A is an elevational view of a second spring seat,
and FIG. 8B is a cross-sectional view of the second spring seat.

DETAILED DESCRIPTION OF EXEMPLARY EMBODIMENTS

Overall Configuration

Figure 3:
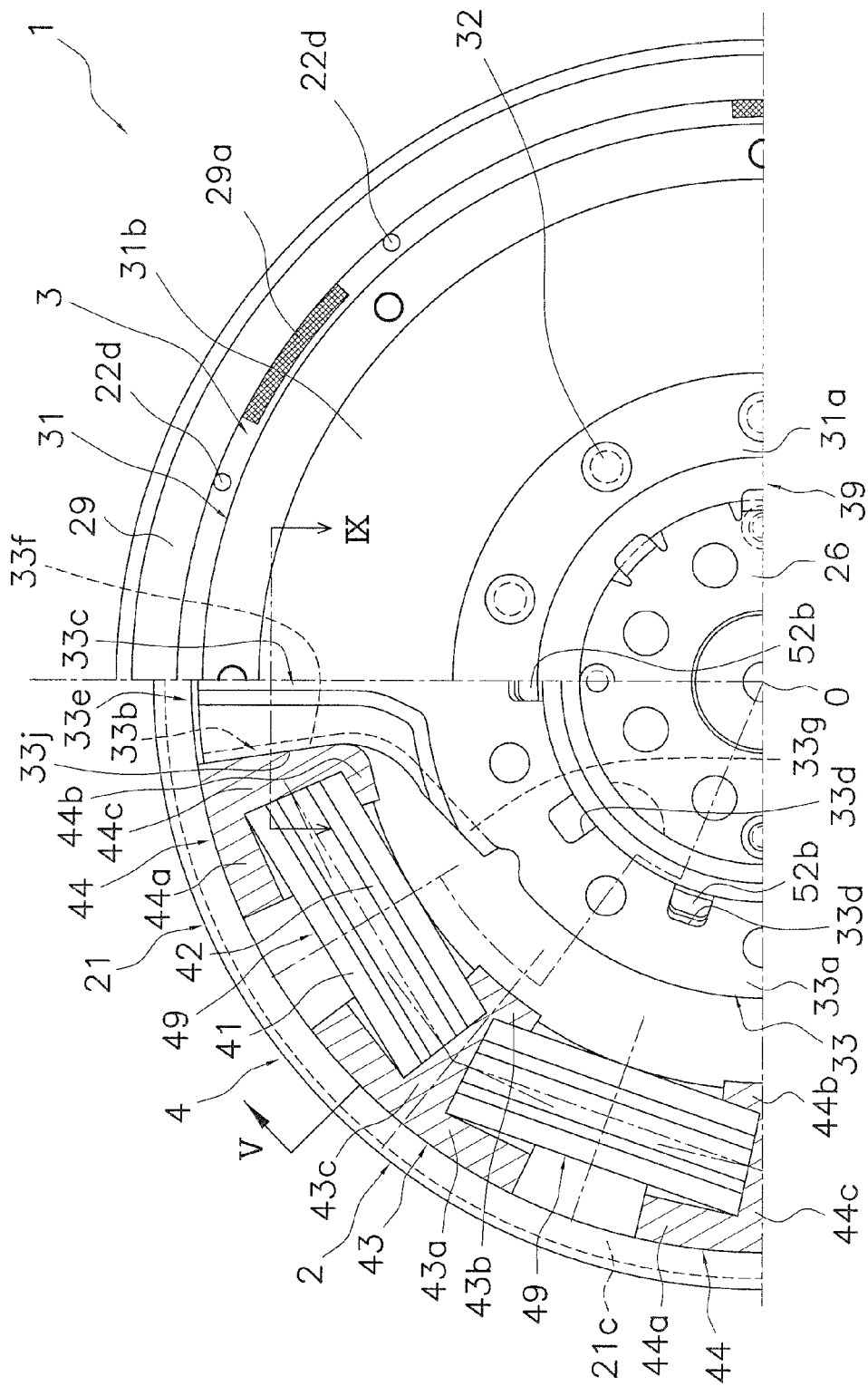
FIG. 3 is an elevational view of the flywheel assembly.
Figure 4:
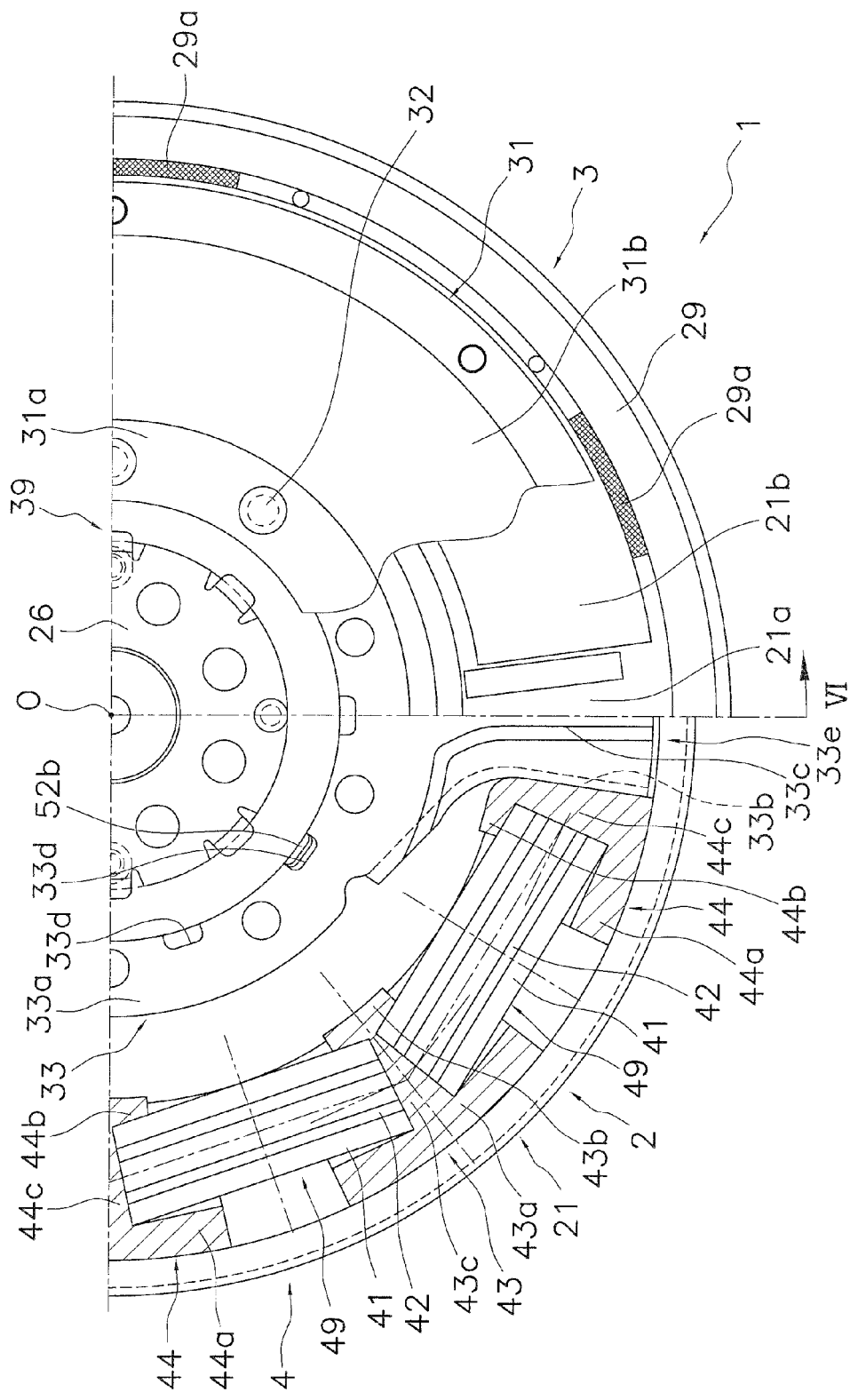
FIG. 4 is an elevational view of the flywheel assembly.
Figure 5:
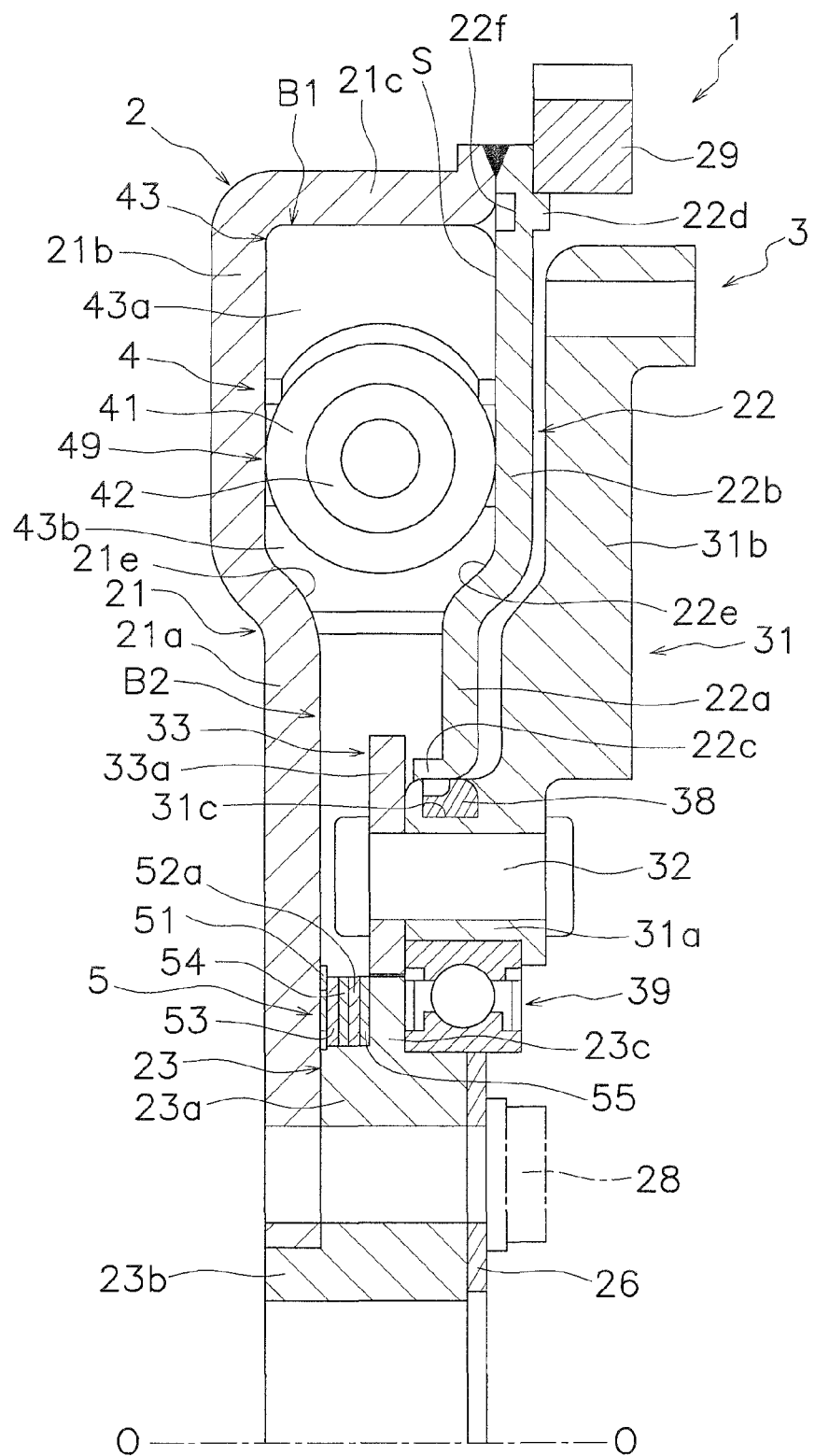
FIG. 5 is a cross-sectional view taken along V-V of FIG. 3.
Figure 6:
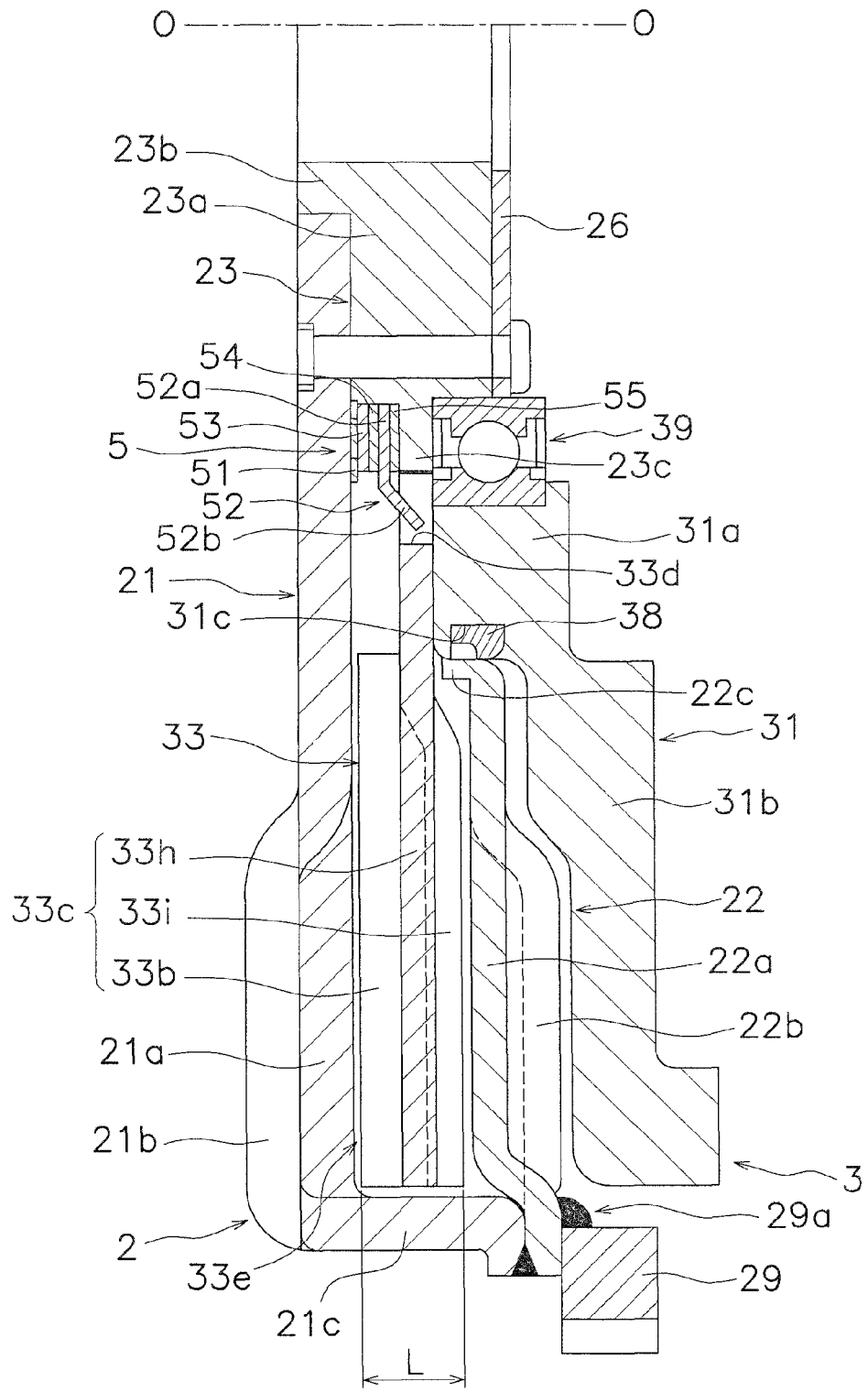
FIG. 6 is a cross-sectional view taken along VI-VI of FIG. 4.

A flywheel assembly 1 will now be explained using FIGS. 1 to 9. In FIG. 2, FIG. 5, and FIG. 6, an engine (not shown) is arranged on a left side and a transmission (not shown) is arranged on a right side. Hereinafter, the left side in FIG. 2, FIG. 5, and FIG. 6 is referred to as the "engine side" (example of first side in axial direction) and the right side is referred to as the "transmission side."

Figure 1:
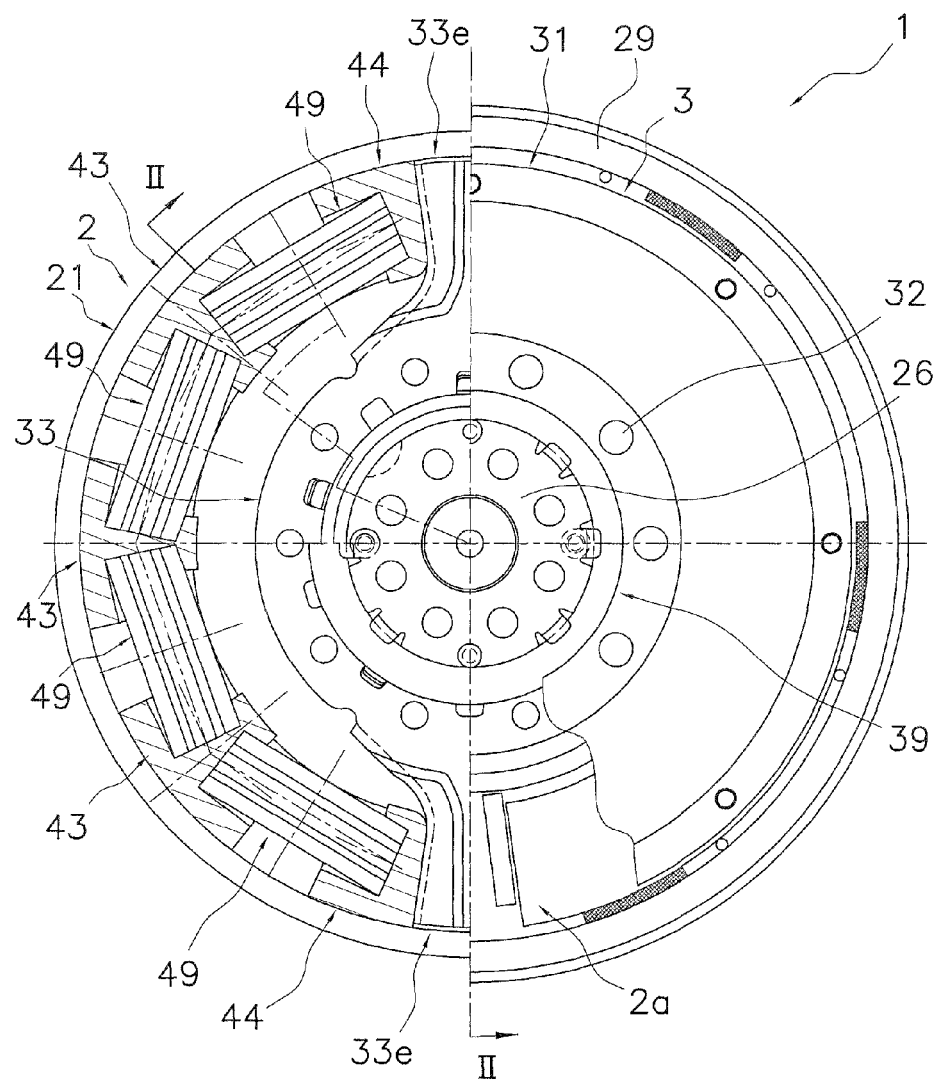
FIG. 1 is an elevational view of a flywheel assembly.
Figure 2:
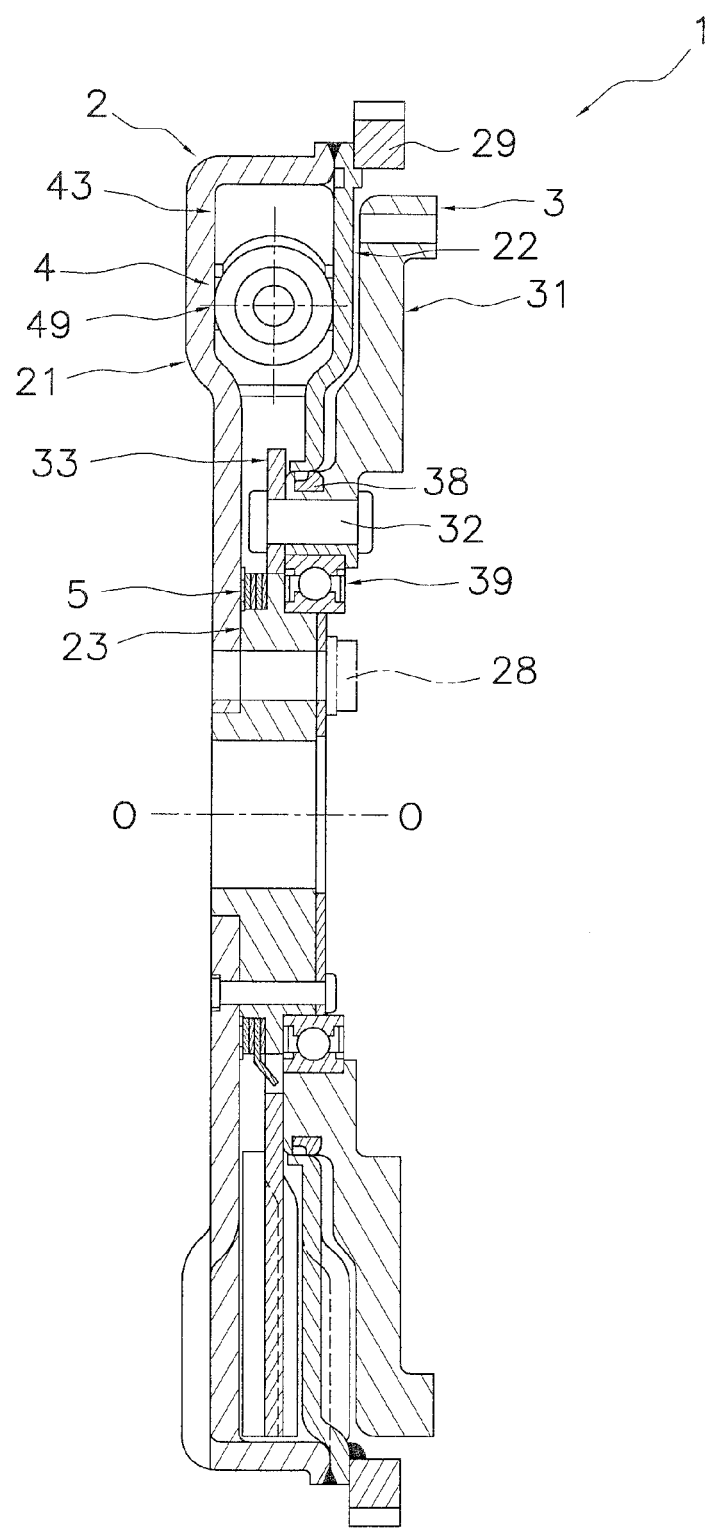
FIG. 2 is a cross-sectional view taken along II-II of FIG. 1.

As shown in FIG. 1, the flywheel assembly 1 is a device for transmitting power generated by the engine to the transmission through a clutch device (not shown). The flywheel assembly 1 has a first flywheel 2 (example of a first rotary body), a second flywheel 3 (example of a second rotary body), a damper mechanism 4, and a friction generating mechanism 5.

First Flywheel

The first flywheel 2 is a member to which power generated by the engine is imparted and is fixed to a crankshaft (not shown) of the engine with a bolt 28. The first flywheel 2 has a first plate 21, a second plate 22, a support member 23, and a pushing plate 26.

The first plate 21 has a first plate main body 21a, two first side sections 21b, and a cylindrical section 21c that extends in an axial direction from an outer circumferential portion of the first plate main body 21a and the first side section 21b.

The first side sections 21b are portions that bulge out farther toward the engine than the first plate main body 21a and are made, for example, using a press forming process. The two first side sections 21b are arranged at an equal pitch in a rotational direction. The first side sections 21b are configured in such a range as to accommodate four spring sets 49 (explained later). A first slanted surface 21e (example of a first slanted surface) that is slanted with respect to an axial direction is formed on an inner circumferential portion of the first side sections 21b. The first slanted surface 21e can slide with respect to a first slanted sliding surface 44d (explained later) of a first spring seat 44 and a second slanted sliding surface 43d (explained later) of a second spring seat 43.

The second plate 22 is an annular member fixed to the cylindrical section 21c and has a second plate main body 22a, two second side sections 22b, an inside cylindrical section 22c, a plurality of support protrusions 22d, and a plurality of recesses 22f.

The second side sections 22b are portions that bulge out farther toward the transmission than the second plate main body 22a and are made, for example, using a press forming process. The two second side sections 22b are arranged at an equal pitch in a rotational direction. The second side sections 22b are configured in such a range as to accommodate four spring sets 49 (explained later). A second slanted surface 22e (example of a first slanted surface) that is slanted with respect to an axial direction is formed on an inner circumferential portion of the second side sections 22b. The second slanted surface 22e forms a pair with the first slanted surface 21e and can slide with respect to the first slanted sliding surface 44d (explained later) of the first spring seat 44 and the second slanted sliding surface 43d (explained later) of the second spring seat 43.

Figure 9:
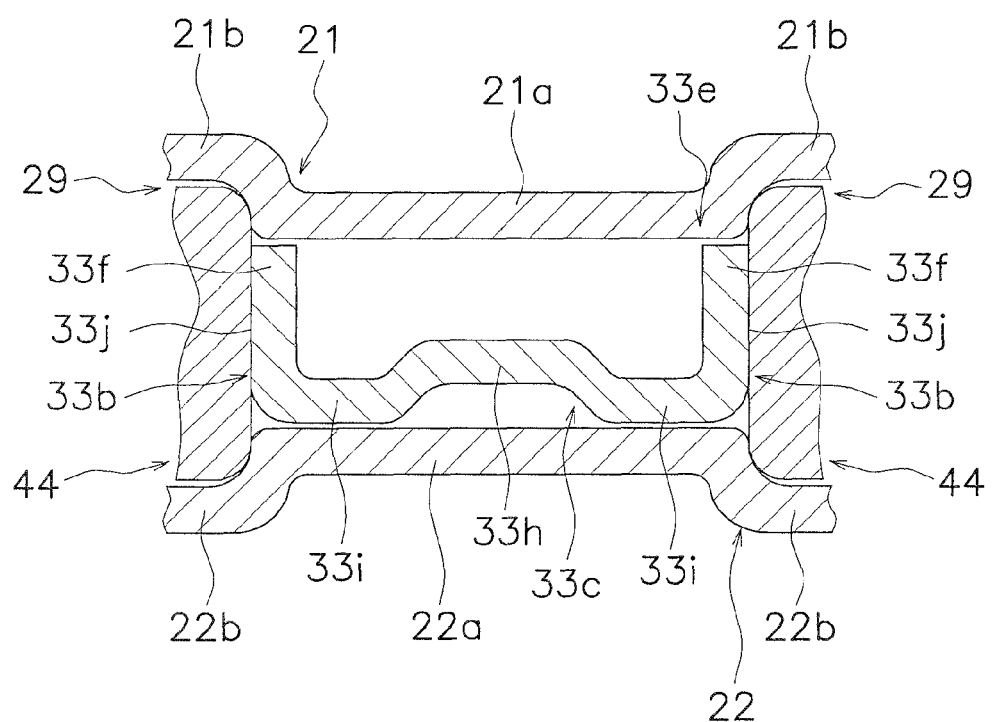
FIG. 9 is a cross-sectional view taken along IX-IX of FIG. 3.

Since the second side sections 22b are arranged facing the first side sections 21b in an axial direction, the first side sections 21b and the second side sections 22b can form a comparatively large space for arranging the spring sets 49 in an outer circumferential portion of the first flywheel 2. As shown in FIG. 9, since an edge portion of the first side sections 21b facing in a rotational direction and an edge portion of the second side sections 22b facing in a rotational direction can touch against the first spring seat 44 in a rotational direction, the first side sections 21b and the second side sections 22b support the first spring seats 44 in a rotational direction. In the first flywheel 2, a support section 2a serves as a portion supporting the first spring seat 44 in a rotational direction.

The support protrusions 22d protrude from the second side sections 22b toward the transmission and are made by, for example, embossing. In addition to making the support protrusions 22d, recesses 22f that are depressed toward the transmission are formed on the axially opposite side as the support protrusions 22d. The support protrusions 22d are arranged at an equal pitch in a circumferential direction, and the recesses 22f are also arranged at an equal pitch in a circumferential direction. The inside cylindrical section 22c is a cylindrical portion extending toward the engine from an inner circumferential portion of the second plate main body 22a and contacts a seal ring 38 (explained later).

The support member 23 has an annular support member main body 23a, an annular protrusion 23b, and an annular sliding section 23c. The support member main body 23a is fixed to the crankshaft together with the first plate 21 by the bolt 28. The annular protrusion 23b is an annular portion that protrudes toward the engine from an inner circumferential portion of the support member main body 23a and serves to position the first plate 21 in a radial direction. The sliding section 23c is a portion that extends from the support member main body 23a in a radial direction and slides with respect to a second bush 55 of the friction generating mechanism 5. A bearing 39 is fitted onto an outer circumferential portion of the support member main body 23a.

The pushing plate 26 is a member for pushing the bearing 39 in an axial direction and is fixed to the crankshaft together with the first plate 21 and the support member 23 by the bolt 28.

Second Flywheel

The second flywheel 3 is a member arranged such that it can rotate with respect to the first flywheel 2 and has a second flywheel main body 31 and an output plate 33 (example of a power transmitting part). The second flywheel 3 is supported by the bearing 39 such that it can rotate relative to the first flywheel 2.

The second flywheel main body 31 is an annular member arranged on a transmission side of the second plate 22 and has a support section 31a and a friction section 31b.

The support section 31a is an annular portion supported by the bearing 39 such that it can rotate with respect to the first flywheel 2 and is arranged radially inside the second plate 22. A seal ring 38 is fitted in a groove 31c of the support section 31a. The seal ring 38 serves to seal a housing space S of the first flywheel 2 with respect to a space outside the first flywheel 2. The housing space S is filled with a lubricating oil. The output plate 33 is fixed to the support section 31a with rivets 32.

The friction section 31b is an annular portion against which a friction facing (not shown) of a clutch disk assembly is pushed and is provided on an outer circumferential portion of the support section 31a. The friction section 31b is arranged on a transmission side of the second plate 22 and bulges out closer to the transmission than the support section 31a.

The output plate 33 is arranged inside the housing space S and fixed to the support section 31a. The output plate 33 has an annular main body section 33a and two transmitting sections 33e extending in a radial direction from the main body section 33a.

The main body section 33a is an annular portion fixed to the support section 31a. A plurality of notches 33d are formed in an inner circumferential portion of the main body section 33a and arranged at an equal pitch in a circumferential direction. Protrusions 52b of a second friction plate 52 are inserted into the notches 33d. As a result, the second friction plate 52 and the second flywheel 3 can rotate as an integral unit.

The transmitting sections 33e are portions to which power transmitted to the first flywheel 2 is transmitted through the four spring sets 49 and each has a first protruding section 33c and a pair of second protruding sections 33b. The first protruding section 33c and the second protruding sections 33b are made, for example, using a press forming process.

The first protruding section 33c is a plate-like portion that protrudes outward in a radial direction from the main body section 33a. The first protruding section 33c has a middle section 33h (example of first protruding section main body) arranged in the same position as the main body section 33a in an axial direction and a pair of outside sections 33i that bulge out farther toward the transmission in an axial direction than the middle section 33h. The pair of outside sections 33i is arranged on both sides of the middle section 33h in a rotational direction.

The second protruding sections 33b are portions that extend toward the engine in an axial direction from rotational-direction-facing edge portions of the first protruding section 33c (more specifically, the outside sections 33i) and each has a contact section 33f and a reinforcing section 33g. The contact section 33f is a portion that extends in a radial direction and has a contact surface 33j that can contact the first spring seat 44 (explained later) in a rotational direction. A thickness direction of the contact section 33f (direction of line perpendicular to the contact surface 33j) is substantially the same as the rotational direction. The reinforcing section 33g is a section connecting a radially inside end portion of the contact section 33f to an outer circumferential portion of the main body section 33a and extends from the radially inside end portion of the contact section 33f to a side toward which the contact surface 33 faces. As shown in FIG. 3 and FIG. 4, the reinforcing section 33g has a curved portion. An axial dimension of the reinforcing section 33g is the same as an axial dimension of the contact section 33f. Since the outside sections 33i bulge out farther toward the transmission than the middle section 33h, the axial dimension L of the contact section 33f can be made comparatively large. Consequently, the surface area of the contact surface 33j can be set to be large. Particularly, the contact surface area between the contact section 33f and the first spring seat 44 is made to be 250 mm$^2$ or larger.

Damper Mechanism

The damper mechanism 4 is a mechanism that connects the first flywheel 2 and the second flywheel 3 together elastically in a rotational direction and has eight spring sets 49, four first spring seats 44, and six second spring seats 43. The damper mechanism 4 includes the first plate 21, the second plate 22, and the output plate 33 already described.

The spring sets 49 have first springs 41 and second springs 42. The second springs 42 are arranged inside first springs 41 such that they act in parallel. The four spring sets 49 are arranged in a pre-compressed state in a first housing section B1 formed by the first side sections 21b, the second side sections 22b, and the cylindrical section 21c such that they can act in series. In this state, the first spring seats 44 arranged between the spring sets 49 and the transmitting sections 33e are contacting the rotation-direction-facing edge portions of the first side sections 21b and the rotation-direction-facing edge portions of the second side sections 22b in a rotational direction.

More specifically, the first spring seats 44 each have a first seat main body 44c, a first outside support section 44a, and a first inside support section 44b. The first seat main body 44c supports an end portion of a spring set 49 in a rotational direction. The first outside support section 44a is a portion extending in a rotational direction from a radially outer portion of the first seat main body 44c and serves to support an end portion of a spring set 49 in a radial direction. The first outside support section 44a can slide with respect to the cylindrical section 21c of the first plate 21.

The first inside support sections 44b are portions extending in a rotational direction from radially inner portions of the first seat main bodies 44c and serve to support end portions of the spring sets 49 in a radial direction. The first inside support sections 44b and the first outside support sections 44a support the end portions of the spring sets 49 not only in a radial direction but also in an axial direction.

Each of the first inside support sections 44b has a shorter length in a rotational direction than those of the first outside support sections 44a. Each of the first inside support sections 44b has a pair of first slanted sliding surfaces 44d (example of a second slanted surface) arranged symmetrically on axially opposite sides of the first inside support section 44b. The first slanted sliding surfaces 44d are slanted with respect to both the axial direction and the radial direction and are formed across the entire first inside support section 44b in the rotational direction. For example, the first slanted sliding surfaces 44d are slanted at approximately 45 degrees with respect to a rotational axis. The first slanted sliding surfaces 44d can slide with respect to the slanted surfaces 21e.

The second spring seats 43 are arranged between spring sets 49. More specifically, the second spring seats 43 each have a second seat main body 43c, a second outside support section 43a, and a second inside support section 43b. The second seat main body 43c supports end portions of spring sets 49 in a rotational direction. The second seat main body 43c supports end portions of spring sets 49 in a rotational direction. The second outside support section 43a is a portion extending in both rotational directions from a radially outer portion of the second seat main body 43c and serves to support the end portions of the spring sets 49 in a radial direction. The second outside support section 43a can slide with respect to the cylindrical section 21c.

The second inside support section 43b is a portion extending in both rotational directions from a radially inner portion of the second seat main body 43c and serves to support end portions of the spring sets 49 in a radial direction. The second inside support section 43b and the second outside support section 43a support the end portions of the spring sets 49 not only in a radial direction but also in an axial direction.

Each of the second inside support sections 43b has a shorter length in a rotational direction than those of the second out-side support sections 43a. Each of the second inside support sections 43b has a pair of second slanted surfaces 43d (example of a second slanted surface) arranged symmetrically on axially opposite sides of the second inside support section 43b. The second slanted sliding surfaces 43d are slanted with respect to both the axial direction and the radial direction and are formed across the entire second inside support section 43b in the rotational direction. For example, the second slanted sliding surfaces 43d are slanted at approximately 45 degrees with respect to a rotational axis. The second slanted sliding surfaces 43d can slide with respect to the slanted surfaces 21e.

The spring sets 49, the first spring seats 44, and the second spring seats 43 are housed in the housing space S of the first flywheel 2. More specifically, the spring sets 49, the first spring seats 44, and the second spring seats 43 are housed inside a first housing section B1 formed by the first side sections 21b, the cylindrical section 21c, and the second side sections 22b. The aforementioned pair of slanted surfaces 21e are formed in a second housing section B2 that is more constricted in an axial direction than the first housing section B1. Consequently, the first spring seats 44 and the second spring seats 43 are housed inside the first housing section B1 such that they can move in a rotational direction while in a state in which their movement is restricted in an axial direction and a radial direction with respect to the first flywheel 2.

Friction Generating Mechanism

The friction generating mechanism 5 is a mechanism for generating a resistance force in a rotational direction between the first flywheel 2 and the second flywheel 3 and has a first friction plate 53, a second friction plate 52, a first bush 54, a second bush 55, and a cone spring 51.

The first friction plate 53 is arranged such that it can rotate integrally with the first flywheel 2 and is arranged on the engine side of the first bush 54.

The second friction plate 52 is arranged such that it can rotate integrally with the second flywheel 3 and has an annular plate main body 52a (example of a second member main body) and a plurality of protrusions 52b protruding outward in a radial direction from the plate main body 52a. The plate main body 52a is arranged axially between the first bush 54 and the second bush 55 and can slide with respect to the first bush 54 and the second bush 55. The protrusions 52b are inserted into the aforementioned notches 33d.

The first bush 54 is sandwiched axially between the first friction plate 53 and the second friction plate 52 and arranged such that the first bush 54 can rotate with respect to the first flywheel 2 and the second flywheel 3. The second bush 55 is sandwiched axially between the second friction plate 52 and the sliding section 23c and arranged such that the second bush 55 can rotate with respect to the second friction plate 52 and the first flywheel 2. The cone spring 51 is arranged axially between the first friction plate 53 and the first plate 21 and presses the first friction plate 53 toward the transmission.

Operation

When the clutch disk assembly pushes against the second flywheel 3, power is transmitted from the engine to the transmission through the flywheel assembly 1 and the clutch disk assembly. More specifically, the first flywheel 2 starts to rotate in a rotational drive direction with respect to the second flywheel 3. As a result, the spring sets 49 start to become compressed between the first flywheel 2 and the second flywheel 3. Still more specifically, the spring sets 49 are compressed in a rotational direction by the first flywheel 2 and the transmitting section 33e of the second flywheel 3. Since the end portions of the spring sets 49 are covered by the first spring seats 44 and the second spring seats 43, the end portions of the spring sets 49 can be prevented from sliding against the first flywheel 2.

Also, when the first flywheel 2 rotates with respect to the second flywheel 3, a frictional resistance is generated in the friction generating mechanism 5. More specifically, since the second friction plate 52 rotates with respect to the first friction plate 53, the first bush 54 slides with respect to the first friction plate 53 or the second friction plate 52. Furthermore, since the sliding section 23c of the support member 23 rotates with respect to the second friction plate 52, the second bush 55 slides with respect to the second friction plate 52 or the sliding section 23c. Consequently, a resistance (i.e., hysteresis torque) is generated in a rotational direction between the first flywheel 2 and the second flywheel 3.

As rotation of the first flywheel 2 with respect to the second flywheel 3 progresses, the first outside support section 44a of the first spring sheet 44 and the second outside support section 43a of the second spring seats 43 contact one another in a rotational direction. As a result, the first spring seat 44 and the second spring seat 43 are pinched between the transmitting section 33e and the support section 2a of the first flywheel 2 and relative rotation of the first flywheel 2 and the second flywheel 3 is stopped. Thus, power is transmitted from the first flywheel 2 to the second flywheel 3 through the first spring seats 44 and the second spring seats 43.

Distinctive Features

Distinctive features of the flywheel assembly described heretofore will now be presented.

(1-1)

With this output plate 33, since the second protruding sections 33b extend toward the engine in an axial direction from a circumferential-direction-facing edge portion of the first protruding section 33c, for example, a surface area of the contact surface 33j of the second protruding section 33b can be made large. As a result, the wear of the second protruding section 33b and wear of the first spring seats 44 (which contact the second protruding section 33b) can be reduced.

(1-2)

With this output plate 33, since the contact sections 33f and the main body section 33a are connected by the reinforcing sections 33g, the strength of the entire transmitting section 33e can be increased.

(1-3)

With this output plate 33, since the reinforcing sections 33g are curved, stress concentration does not readily occur in the reinforcing sections 33g and damage to the second protruding sections 33b can be suppressed.

(1-4)

With this output plate 33, since the reinforcing sections 33g extend toward where the contact surfaces 33j face, a tensile force—not a compressive force—acts readily on the reinforcing sections 33g when power is transmitted by the transmitting sections 33e. Thus, the overall strength of the protruding sections and the transmitting sections 33e can be increased.

(1-5)

With this output plate 33, it is easy to secure a large power transmitting surface area because a thickness direction of the contact sections 33f is substantially the same as a rotational direction.

(1-6)

With this output plate 33, since the outside sections 33i of the first protruding section 33c bulges out toward the transmission farther than the middle section 33h, the second protruding sections 33b extending toward the engine in an axial direction from edge portions of the outside sections 33i can be made to have larger dimensions in an axial direction. That is, the surface areas of the contact surfaces 33j of the transmitting section 33e can be made even larger.

(1-7)

Since the flywheel assembly 1 uses such an output plate 33, a large power transmitting surface area can be secured and wear of the first spring seats 44 can be reduced.

(2-1)

With this damper mechanism 4, a friction surface can be increased because the first bush 54 is sandwiched axially between the first friction plate 53 and the second friction plate 52 and the second bush 55 is sandwiched axially between the first friction plate 53 and the second flywheel 3. As a result, the vibration damping performance of the damper mechanism can be heightened.

(2-2)

With this damper mechanism 4, since the protrusions 52b of the second friction plate 52 are inserted into the notches 33d of the output plate 33, an arrangement in which the second friction plate 52 rotates integrally with the second flywheel 3 can be achieved with a simple structure.

(2-3)

With this damper mechanism 4, since the sliding section 23c of the support member 23 is arranged radially inside the main body section 33a of the output plate 33, an arrangement in which the second bush 55 is sandwiched axially between the second friction plate 52 and the sliding section 23c can be achieved with a simple structure.

(3-1)

With this output plate 33, since the second plate 22 has a plurality of support protrusions 22d, the ring gear 29 can be positioned easily with respect to the second plate 22. That is, the ring gear 29 can be positioned by merely providing support protrusions 22 on the second plate 22 and the manufacturing cost can be reduced.

(3-2)

With this output plate 33, since the support protrusions 22d are arranged on a radially inward side of the ring gear 29, the support protrusions 22d can be prevented from causing an axial dimension of the second plate 22 to increase.

(3-3)

With this output plate 33, since the weld sections 29a are arranged circumferentially-between adjacent support protrusions 22d, the ring gear 29 can be positioned and fastened in a small space.

(3-4)

With the output plate 33, the increase in weight caused by the support protrusions 22d can be reduced because the second plate 22 has recesses 22f arranged on the engine side of the support protrusions 22d.

(3-5)

With this flywheel assembly 1, the manufacturing cost can be reduced because the second flywheel 3 has such an output plate 33.

(4-1)

With this damper mechanism 4, since the first slanted sliding surfaces 44d of the first spring seats 44 can slide with respect to the slanted surfaces 21e of the first flywheel 2, the operation of the first spring seats 44 is stable and the vibration damping performance can be stabilized.

Also since the second slanted sliding surfaces 43d of the second spring seats 43 can slide with respect to the slanted surfaces 21e of the first flywheel 2, the operation of the second spring seats 43 is stable and the vibration damping performance can be stabilized.

(4-2)

With this damper mechanism 4, since the pair of first slanted sliding surfaces 44d is formed on a first inside support section 44b extending in a rotational direction, a rotational-direction length of the first slanted sliding surfaces 44d can be made larger and the operation of the first spring seats 44 can be stabilized more readily.

Also, since the pair of second slanted sliding surfaces 43d is formed on a second inside support section 43b extending in a rotational direction, a rotational-direction length of the second slanted sliding surfaces 43d can be made larger and the operation of the second spring seats 43 can be stabilized more readily.

(4-3)

With this damper mechanism 4, since the pairs of slanted surfaces 21e and 22e are formed in a constricted portion of the second housing section B2, an axial dimension of the second housing section B2 can be shortened and the operation of the first spring seats 44 and the second spring seats 43 can be stabilized.

(4-4)

With this damper mechanism 4, since the first housing section B1 and the second housing section B2 are formed by the first plate 21 and the second plate 22, the first housing section B1 and the second housing section B2 can be formed with a simple structure.

(4-5)

With this damper mechanism 4, the first spring seats 44 and the second spring seats 43 are guided in a rotational direction because the first spring seats 44 and the second spring seats 43 are supported in an axial direction and a radial direction by the first side sections 21b, the cylindrical section 21c, and the second side sections 22b. With this configuration, the operation of the first spring seats 44 and the second spring seats 43 in a rotational direction is stable.

(5-1)

With this damper mechanism 4, wear of the first spring seats 44 can be reduced because a contact surface area between the second protruding sections 33b (more specifically, the contact sections 33f) of the first flywheel 2 and the first spring seats 44 is at least 250 mm$^2$ (5-2)

With this damper mechanism 4, a stopper mechanism restricting a relative rotation angle between the first flywheel 2 and the second flywheel 3 can be achieved with the first spring seats 44 and the second spring seats 43.

Other Embodiments

The present invention is not limited to the embodiment described heretofore and various variations and revisions can be made without departing from the scope of the present invention.

(1)

Although in the previously explained embodiment the second protruding sections 33b extend from the first protruding section 33c toward the engine in an axial direction, it is acceptable for the second protruding sections 33b to extend axially toward both the engine and the transmission from edge portions of the first protruding section 33c if the entire first protruding section 33c is arranged in the same position as the main body section 33a in the axial direction. In this way, the overall strength of the transmitting sections 33e can be increased.

(2)

Although in the previously explained embodiment a flywheel assembly 1 is presented as the device employing the output plate 33, it is acceptable for the device employing the output plate to be any other device that serves to transmit power.

INDUSTRIAL APPLICABILITY

The present invention is useful in the field of devices that transmit power.

What is claimed is:

1. A damper mechanism, comprising:
a first rotary body;
a second rotary body being arranged such to be rotatable with respect to the first rotary body, the second rotary body including
an annular main body section, and
a plate-like transmitting section having
a first protruding section extending outward in a radial direction from the main body section, and
a second protruding section extending in the radial direction, the second protruding section having a width which extends toward a first side in an axial direction from a circumferential-direction-facing edge portion being an end part of the first protruding section, the second protruding section
forming an angle being substantially perpendicular with the first protruding section,
the first protruding section including
a first protruding section main body that is arranged in substantially the same position as the main body section in the axial direction and extends outward in the radial direction from the main body section, and
an outside section that extends in the radial direction, and has a width extending in the rotational direction from a rotational-direction-facing edge portion of the first protruding section main body and bulges out farther in the axial direction than the first protruding section main body;
a spring elastically connecting the first rotary body and the second rotary body together in a rotational direction and being configured to be compressed between the first rotary body and the transmitting section of the power transmitting part; and
a spring seat arranged between the first rotary body and the transmitting section and supporting an end portion of the spring.

2. The damper mechanism of claim 1, wherein the second protruding section has
a first portion that extends in a radial direction, and
a second portion that connects a radially inside end portion of the first portion to an outer circumferential portion of the main body section.

3. The damper mechanism of claim 2, wherein the second portion is curved when viewed from the axial direction.

4. The damper mechanism of claim 2, wherein
the first portion has a transmitting surface that is arranged to face in the circumferential direction to transmit power, and
the second portion extends to a side toward which the transmitting surface faces.

5. The damper mechanism of claim 2, wherein
a thickness direction of the first portion is substantially the same as the circumferential direction,
the thickness direction is perpendicular to a direction in which the second protruding section extends.

6. The damper mechanism of claim 1, wherein
the transmitting section also extends toward a side opposite the first side in the axial direction from the circumferential-direction-facing edge portion of the first protruding section.

7. A damper mechanism, comprising:
a first rotary body;
a second rotary body arranged to be rotatable with respect to the first rotary body;

a first member provided to be integrally rotatable with the first rotary body;

a second member provided to be integrally rotatable with the second rotary body;

a first friction member provided to be rotatable with respect to the first member and the second member;

a second friction member being provided to be rotatable with respect to the second member and the second rotary body, a distance in an axial direction between the second friction member and the second rotary body being shorter than a distance in the axial direction between the second member and the second rotary body, the first friction member being next to the first member, the second member being next to the first friction member, the second friction member being next to the second member, the first member being closer to the first rotary body than the first friction member to the first rotary body; and a pressing member pressing the second member toward the second rotary body in the axial direction, the second rotary body having an annular main body section with a notch provided in an inner circumferential portion, the first rotary body having an annular sliding section that slides with respect to the second friction member, the main body section being arranged in substantially the same position as the sliding section in the axial direction and to an outside of the sliding section in the radial direction, the pressing member being between the first rotary body and the first member in the axial direction, the first member being between the pressing member and the first friction member in the axial direction, the first friction member being between the first member and the second member in the axial direction, the second member being between the first friction member and the second friction member in the axial direction, a distance in the axial direction between the first member and the first rotary body is shorter than a distance in the axial direction between the first friction member and the first rotary body.

8. The damper mechanism of claim 7, further comprising a spring set that elastically connects the first rotary body and the second rotary body together in a rotational direction, the second rotary body having a transmitting section that protrudes outward in a radial direction from the main body section and contacts the spring set in the rotational direction, and the second member having an annular second member main body arranged axially between the first friction member and the second friction member, and a protrusion that protrudes outward in the radial direction from the second member main body and is inserted into the notch.

9. A flywheel assembly, comprising:

a damper mechanism including a first rotary body, a second rotary body arranged to be rotatable with respect to the first rotary body, a first member provided to be integrally rotatable with the first rotary body;

a second member provided to be integrally rotatable with the second rotary body, a first friction member provided to be rotatable with respect to the first member and the second member, a second friction member provided to be rotatable with respect to the second member and the second rotary body, wherein a distance in an axial direction between the second friction member and the second rotary body is shorter than a distance in the axial direction between the second member and the second rotary body, the first friction member is next to the first member, the second member is next to the first friction member, the second friction member is next to the second member, the first member is closer to the first rotary body than the first friction member to the first rotary body, and a pressing member pressing the second member toward the second rotary body in the axial direction;

a first flywheel having a power transmitting part;

a second flywheel arranged to be rotatable with respect to the first flywheel; and a damper mechanism elastically connecting the power transmitting part and the second flywheel together in a rotational direction, the second rotary body having an annular main body section with a notch provided in an inner circumferential portion, the first rotary body having an annular sliding section that slides with respect to the second friction member, the main body section being arranged in substantially the same position as the sliding section in the axial direction and to an outside of the sliding section in the radial direction, the pressing member being between the first rotary body and the first member in the axial direction, the first member being between the pressing member and the first friction member in the axial direction, the first friction member being between the first member and the second member in the axial direction, the second member being between the first friction member and the second friction member in the axial direction, a distance in the axial direction between the first member and the first rotary body is shorter than a distance in the axial direction between the first friction member and the first rotary body.

* * * * *